US012712907B2

(12) United States Patent
Karpovsky et al.

(10) Patent No.: US 12,712,907 B2
(45) Date of Patent: Aug. 18, 2026

(54) NETWORK GRAPH ANALYSIS

(71) Applicant: Microsoft Technology Licensing, LLC, Redmond, WA (US)

(72) Inventors: Andrey Karpovsky, Kiryat Motzkin (IL); Evgeny Bogokovsky, Kfar Saba (IL); Ram Haim Pliskin, Rishon lezion (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 100 days.

(21) Appl. No.: 18/676,493

(22) Filed: May 28, 2024

(65) Prior Publication Data

US 2025/0373643 A1 Dec. 4, 2025

(51) Int. Cl.
*H04L 9/40* (2022.01)

(52) U.S. Cl.
CPC ...... *H04L 63/1433* (2013.01); *H04L 63/1425* (2013.01)

(58) Field of Classification Search
CPC ........................ H04L 63/1433; H04L 63/1425
See application file for complete search history.

(56) References Cited

U.S. PATENT DOCUMENTS

| | | | | |
|---|---|---|---|---|
| 11,277,425 | B2 * | 3/2022 | Kulkarni | G06F 18/29 |
| 11,831,670 | B1 * | 11/2023 | Molls | H04L 63/1441 |
| 12,388,859 | B2 * | 8/2025 | Ungureanu | H04L 41/145 |
| 2020/0336499 | A1 * | 10/2020 | Kulkarni | G06F 18/29 |
| 2021/0336971 | A1 * | 10/2021 | Robbins | G06F 16/212 |
| 2021/0360032 | A1 * | 11/2021 | Crabtree | H04L 63/20 |
| 2023/0102103 | A1 * | 3/2023 | Mazumder | G06N 7/01 726/23 |
| 2023/0156031 | A1 * | 5/2023 | Subramanian | H04L 63/14 726/25 |
| 2024/0243970 | A1 * | 7/2024 | Shem-Tov | H04L 41/082 |
| 2025/0047701 | A1 * | 2/2025 | Siddam | H04L 41/22 |
| 2025/0141909 | A1 * | 5/2025 | Makovoz | H04L 63/1433 |

* cited by examiner

*Primary Examiner* — Amir Mehrmanesh
*Assistant Examiner* — Thomas A Gyorfi
(74) *Attorney, Agent, or Firm* — Pillsbury Winthrop Shaw Pittman LLP

(57) ABSTRACT

A computer-implemented method comprising: obtaining an asset graph representing a network, the asset graph comprising a plurality of nodes representing assets of the network and edges representing relationships between the assets; calculating, using the graph, a local connectivity metric for a node of the graph; based on the local connectivity metric, identifying a local pattern associated with a potential security risk; and identifying a candidate node or a candidate edge based on the identified local pattern associated with the potential security risk.

20 Claims, 5 Drawing Sheets

100
Obtain asset graph representing network.
S102
Calculate a local connectivity metric for a node of the graph.
S104
Identify local pattern associated with potential security risk, based on the locally connectivity metric.
S106
Identify a target node/edge based on the identified local pattern.
S108

200

NETWORK GRAPH ANALYSIS

TECHNICAL FIELD

The present disclosure pertains to the field of cybersecurity, and in particular analysing network graphs for use in cybersecurity systems.

BACKGROUND

In the field of cybersecurity, graphs allow for real-time analysis of a network system. This allows security teams to detect and respond to threats to the network more rapidly.

One common type of graph used in the security domain is an asset/entity graph. It consists of nodes representing assets, such as cloud resources, devices, users, applications, etc. and edges representing relations between them, such as a user having permission to a database, a database being installed on a server, etc.

One usage of this graph is finding possible access paths between entities and resources, prioritized by some property, such as criticality of the resources. For example, all the paths can be found between a set of users or virtual machines (VMs) to all the critical resources they can access using direct authorization, tokens, or permissions inherited from higher-level policies.

SUMMARY

Herein is provided a method for processing an asset graph representing a network. Once obtained, local connectivity metrics are calculated for nodes of the graph. Using the calculated connectivity metrics, local patterns can be identified which present a potential security risk. A candidate node or edge of the graph is identified which corresponds to the local pattern.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Nor is the claimed subject matter limited to implementations that solve any or all of the disadvantages noted herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

Figure 1:
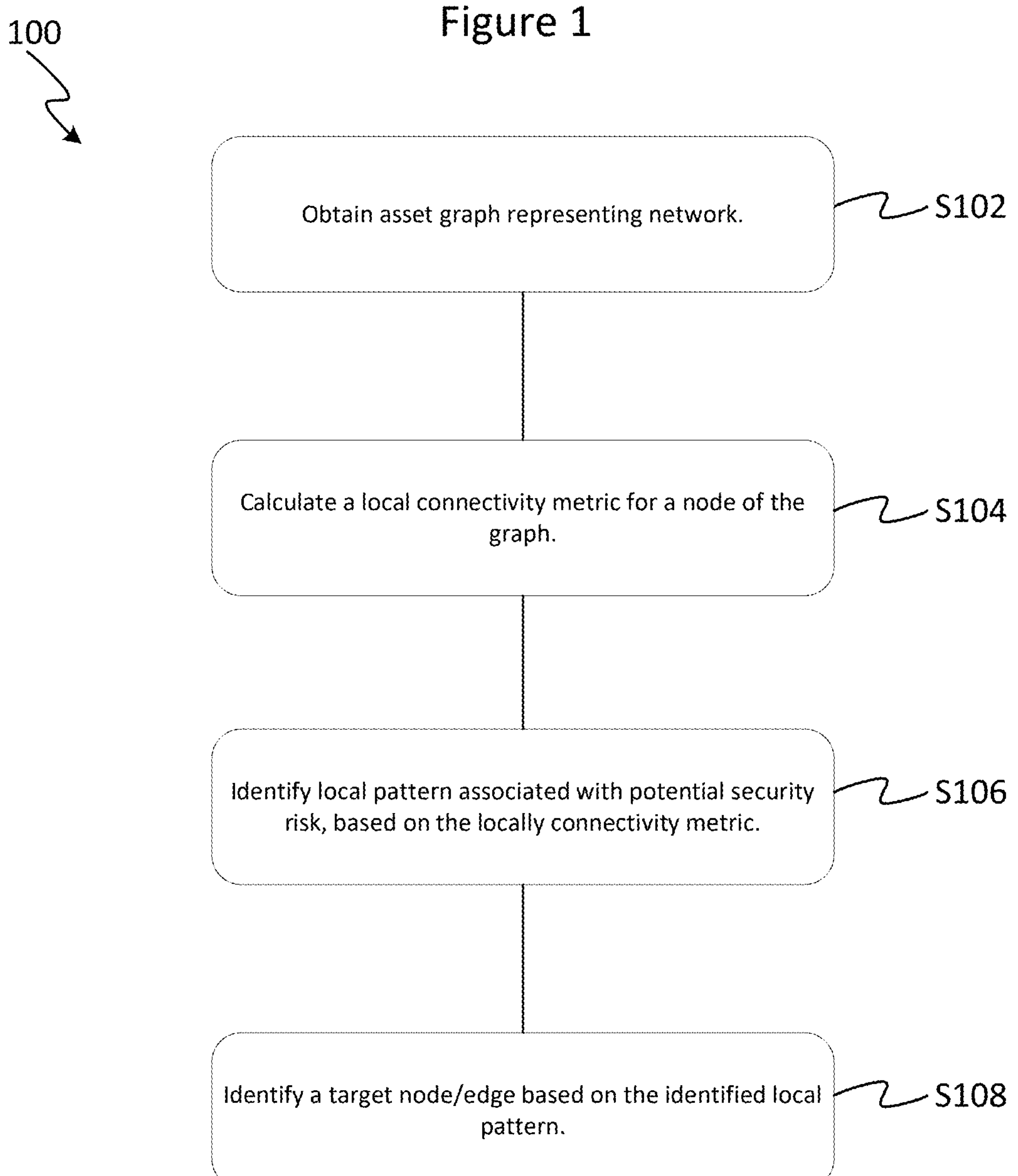
FIG. 1 is a flow chart of an example method of analysing an asset graph representing a network.

The following detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

An asset/entity graph, representing a network, can be used to find possible access paths between entities and resources within the network. These paths provide a basis for various security features in the domain of Extended Security Posture Management (XSPM) and Extended Detection and Response (XDR). For example, a Blast Radius of each user can be calculated and suggestions for hardening them accordingly can be provided, for example requiring strong passwords or limiting external access for those who have access to lots of critical resources. Alternatively, alerts can be provided in context-thus at the beginning of an attack, which triggers an alert, it can be predicted what will be attacked at the next step or at the end, and potentially disrupt it. This context improves security value tremendously.

The graph approach is very useful for detecting network patterns that may cause security issues. Alternatively, it can be used to detect paths of potential attack stages. However, computer networks are inherently highly interconnected, so even a small number of nodes with direct connections can potentially generate a huge number of patterns or paths. This makes the results hard to understand and mitigate against, creates unnecessary noise, reduces security value, and increases the likelihood of false positives in results. As a consequence, the results themselves are less accurate and thus the security risk is increased even during network monitoring.

Example embodiments described herein are capable of processing a graph representing a network for use in security management. Through processing the graph, areas of the graph, and therefore of the network, are identified which may lead to inefficiencies or even incorrect results when used by a security management system.

By pre-processing the graph as described herein, areas of the graph or network which may reduce the effectiveness of the graph during the real-time analysis of the system by a graph-based security feature are identified. The graph or network may be modified so that the potential security risk is reduced or mitigated before the graph is used to monitor the network.

The graph or network may be modified in response to the identified potentially problematic areas, thereby removing or reducing the associated risks. Therefore, pre-processing the graph ultimately improves the results of graph-based security features. The results are easier to interpret, noise is reduced, and the likelihood of false positives in results decreases. Overall, this improves the security system. Further, the efficiency of the system is improved because the graph-based security features do not need to traverse complex local patters in the graph, thus increasing the speed at which the graph can be processed and reducing the computational requirements when processing the graph.

Two problems that emerge in map-based, or graph-based, security features are:

1. detecting insecure network patterns using graph data is very promising, but it is hard to convert the patterns to actionable specific recommendations; and
2. the cardinality of map-based output (such as possible paths) can be very high, which makes the output unintelligible.

To address this, local connectivity patterns of an organization map are determined, and metrics that reflect potential security issues or high cardinality of output are calculated.

In the examples provided herein, the graphs represent a group of virtual machines (VMs) connected to a group of storage accounts using shared keys. It will be appreciated that the same principles provided herein can be applied to network graphs representing other assets and relationships.

One example local connectivity pattern which may be potentially problematic when used in a security system is a chokepoint pattern. A chokepoint may be defined as a point in a network through which most or all of the network traffic flows. In an example chokepoint pattern, a large number of VMs are connected to all storage accounts. For example, if there are 100 VMs each connected to 300 storage accounts, connected by a single shared token, there are 100×300=30000 potential paths.

The chokepoint in the context provided herein is defined as areas of exceptionally high connectivity of a suitable node. It is not limited to a point in a network at which all inputs are connected to all outpoints. A chokepoint threshold is defined, which defines a number of connections of a node above which there is deemed to be a chokepoint. The chokepoint threshold may be a normalised value, with the number of connections of a node being normalised with respect to the total number of connections in the network.

Another example local connectivity pattern which may be potentially problematic when used in a security system is referred to herein as a vortex pattern. In a vortex pattern, several VMs are connected to each other via several tokens. In this connectivity pattern, there are paths such as:

$$(VM\ A) \text{->} [\text{token } X] \text{->} (VM\ B) \text{->} [\text{token } Y] \text{->} (VM\ C) \text{->} [\text{token } Z] \text{->} (VM\ D)$$

Since all permutations are possible, with 20 VMs and 5 tokens, and limiting the path length to 4 hops, there are 20×5×20×5×20×5×20×5×20=20000000 potential paths.

A vortex threshold number of nodes and/or tokens may be defined, which is used to identify a vortex pattern. That is, if the number of nodes and tokens connecting the nodes exceeds the vortex threshold, the connectivity pattern is a vortex pattern. The number chosen for the vortex threshold is chosen such that the patterns identified as vortexes are of interest, i.e. that the presence of the identified vortex will likely have a negative impact on the ability of the security system. This ensures that the patterns identified as vortexes are only those for which alterations to the pattern achieve sufficient performance improvements, given the alterations required. For a vortex threshold number of asset nodes (VMs, storages, etc.) N, there would be N−1 token nodes connecting the N asset nodes.

The vortex threshold may be hardcoded. In some embodiments, the vortex threshold may be defined by an operator of the system, and may be variable. The vortex threshold may be defined taking into consideration the graph representing the network. An example vortex threshold is 20. This has been found to identify vortex patterns which provide improvements to performance when altered. The vortex threshold may be in the range of 15 to 25. It will be appreciated that other vortex thresholds may be defined. The vortex threshold may be defined taking into consideration the capabilities of the security system.

Other patterns and their combinations are possible.

To identify the local connectivity pattern which may be potentially problematic, one or more connectivity metrics are calculated. These connectivity metrics are calculated locally, that is node-by-node. The connectivity metrics are graph analysis concepts, which have been chosen specifically because of their ability to be used to identify possible problematic paths. Some useful graph analysis concepts are:

Connectivity of node v, where InDegree of the node is the number of incoming edges into the node, and OutDegree is the number of outgoing edges out of the node:

$$c(v) = InDegree(v) \cdot OutDegree(v)$$

Betweenness of node v, where $\sigma_{st}$ is the number of shortest paths between s and t, and $\sigma_{st}$ (v) is the number of such paths passing though v:

$$b(v) = \sum \frac{\sigma_{st}(v)}{\sigma_{st}}$$

In/Out node similarity of node v with inbound set/and outbound set O:

$$s(v) = \frac{I_v \cap O_v}{I_v \cup O_v}$$

That is, the connectivity of a node is the product of the InDegree of the node and the OutDegree of the node.

To calculate the betweenness of the node, the shortest distance between two points, or nodes, in the graph is divided by the number of these paths passing through the node. The betweenness is the sum of these quotients for s≠v≠t.

To calculate the In/Out node similarity, the inbound set and outbound set of edges are found for the node. The union and intersect of these two sets are then calculated. The In/Out node similarity is the intersect divided by the union. A node with high In/Out node similarity, that is a large proportion of its inbound edges are also outbound edges, the closer to 1 the In/Out node similarity will be, with the In/Out node similarity decreasing as the number of inbound edges which are not outbound edge increases.

Using these connectivity metrics, problematic patterns are identified. This can be calculated very early over local parts of the map. For example, chokepoint pattern is defined as high total degree and high betweenness metrics. Vortex pattern is defined by high total degree and in/out similarity, repeated at least several times.

A threshold value for each connectivity metric is defined. If the calculated connectively metric is above the threshold value for that metric, the node v is determined to be associated with a problematic local connectivity pattern. The threshold values chosen for the connectivity metrics may be based on historic security network monitoring data, which is used to identify trends in connectivity metrics at problematic nodes of networks.

If the identified pattern presents a security issue, a clear and actionable suggestion can be made to mitigate it in advance. For example, overburdened tokens or sets of keys that connect large numbers of heterogeneous entities and resources can be detected. These keys can be exposed, with a suggestion to cancel them or split granted access.

When used in a graph-based security system, attack paths are created over the graph when some vulnerabilities exist in the network. A predictive model can also be created using the connectivity metrics, which is capable of predicting the number of attack paths that will be generated when passing through the local pattern. Again, this can be calculated very early over local parts of the map. The predictive model is therefore used to predict the number of attack paths.

The number and location of the predicted attack paths can be used to identify vulnerabilities. For example, if there is some vulnerability on one of VMs of a vortex pattern, it will generate some specific high number of paths right away. This high number of paths can be calculated depending on the product; it is a function of number of assets, path length limit, etc. as will be apparent to a person skilled in the art. The predictive model, together with the connectivity patterns, can therefore identify this vulnerability.

Using the predictive model, if the predicted number of paths is over some high threshold, it can be known in advance that noise will be generated. Preventative measures can be applied to the graph to reduce or remove the noise, such as by clustering or similar approaches.

The output of the model provides various opportunities for product improvements. An explanatory layer can be created for the high number of paths, along with suggestions to mitigate them by changing the local pattern. An owner of the network represented by the graph can be notified in advance about a potential problem when onboarding graph-based features.

The predictive model may be any statistical model which is capable of making predictions. These models may use historic data of network security monitoring systems to make the predictions. Such models are known in the art and will not be described in further detail herein.

Thus, the methods provided herein transform graph insights into clear and actionable suggestions, decreasing noise, improving security value and customer satisfaction.

FIG. 1 provides an example method 100.

At step S102, an asset graph representing a network is obtained. The asset graph comprises a plurality of nodes representing assets of the network and edges representing relationships between the assets.

At step S104, a local connectivity metric is calculated for a node of the graph. The connectivity metric may be the connectivity c, betweenness b, or in/out node similarity s of the node as described above. Other local connectivity metrics may be calculated, which can be used to identify problematic local patterns. One or more of the local connectivity metrics may be calculated in step S104.

Step S104 may be executed for each node of the graph. In other embodiments, a subset of nodes of the graph may be analysed. The nodes over which the analysis is performed may be determined based on prior security analysis of the network. For example, a location of a previously identified security risk, or security attack may be used to determine nodes of the graph to analyse using the method 100 of FIG. 1. In each embodiment, the connectivity metric is local, that is it is calculated for a single node.

At step S106, a local pattern is identified which is associated with a potential security risk. The local pattern is identified based on the calculated local connectivity metric. Example local patterns which may be of interest to identify in the security context are vortexes and chokepoints, as described above. These patterns are associated with a potential security risk because they reduce the effectiveness of graph-based security analysis, thereby providing areas of a network in which an attack may go unnoticed. Additionally or alternatively, the patterns may show areas which are easier, and so more likely, for an attacker to implement an attack, thereby identifying a security risk.

At step S108, a candidate node and/or candidate edge is identified based on the local pattern associated with the potential security risk are identified.

The candidate node and/or candidate edge is dependent on the local pattern. For example, a local pattern may indicate that a particular token is overburdened, which relates to a candidate edge. The local pattern may also, or alternatively, identify an asset which is connected to too many other assets. This relates to a candidate node. It will be appreciated that the pattern may be used to identify a single candidate node, a single candidate edge, or any combination of one or more candidate nodes and candidate edges.

Figure 2:
FIG. 2 is a flow chart of an example modified method of analysing an asset graph representing a network.

In some embodiments, the method further comprises generating a predictive model for the number of paths that will be generated when passing through the local pattern. FIG. 2 provides a modified method 200 in which access path predictions are made.

Steps S202, S204, and S206 reflect steps S102, S104, and S106 of method 100.

At step S208, once the local patterns have been identified, the number of access paths passing through the local pattern is predicted using the predictive model.

At step S210, it is determined if the number of access paths passing through the local pattern exceeds an access path threshold. The access path threshold is set so as to identify noisy areas in the graph when the graph is used in a map-based security feature. In this way, if the number of predicted access paths exceeds the access path threshold, it is determined that noise will likely be generated when the graph is used. This noise reduces the effectiveness of the map-based security feature in the area of the graph associated with the local pattern.

The access path threshold may be a constant, for example is may be assumed that more than 10000 paths is too much to handle, and thus the access path threshold is set to 10000. Alternatively, the access path threshold may be a function of a number of existing assets so that the access path threshold can be variable depending on the size of the organisations or networks. For example, the access path threshold may be number of assets*100.

The access path threshold may additionally or alternatively be defined such that it identifies vulnerabilities in the local pattern. For example, it may be observed through historic data of network security monitoring that a certain number of attack paths through a vortex pattern indicates a vulnerable asset of the network. The access path threshold may then be defined to be equal to, or slightly less than, the observed number of paths.

At step S212, the candidate node and/or candidate edge is determined based on the determination that the number of access paths exceeds the threshold. That is, the candidate node and/or candidate edge is a node/edge which is associated with a local connectivity pattern with a potential security risk which is likely to have a large number of paths passing therethrough.

The path predictions made in method 200 are used to identify noise, while the local patterns themselves are used to identify potentially problematic assets or relationships (such as keys or tokens). The method 200 may therefore be further modified to identify candidate nodes/edges based on predicted paths and candidate nodes/edges based on the local patterns. In this way, both noise generating areas of the graph and areas which themselves present a security risk can be identified.

The outputs of the graph analysis methods 100, 200 provided in FIGS. 1 and 2 may be used to provide further outputs. The further outputs are suggestions which can be implemented to reduce the security risk associated with the local patterns. Such suggestions may be modification suggestions, which include network modification suggestions and graph modification suggestions.

In one embodiment, the identified candidate node or edge is used to determine a network modification suggestion. Each node is associated with an asset in the network represented by the graph, and each edge is associated with a relationship between assets. The corresponding asset or relationship is identified from the candidate node or edge, and a suggestion for modifying the asset or relationship so as to reduce the potential security risk associated therewith.

For example, the local pattern identifies an overburdened token presenting a potential security risk. The network modification suggestion modifies the use of that token, so that the security risk associated with the token is reduced. For example, the token may be removed entirely from the network, or the number of assets which may be accessed using the token may be reduced. In both of these examples, when the modification is implemented in the network the security risk associated with the token decreases.

In another example, the local pattern identifies an asset which allows access by a high number of tokens or keys, and thereby presents a security risk. This network modification suggestion modifies the granted access to the asset so that the security risk associated with the asset is reduced. For example, the network suggestion may be to split granted access to the asset, or reducing the ways in which the asset can be accessed. Splitting granted access in this context refers to increasing the number of tokens whilst decreasing the number of asset nodes to which the tokens provide access. For example, if there is a token (ssh key) connecting 100 VMs to 500 storages, thus creating 50000 paths or more, a suggestion may be to split the access to 10 keys connecting smaller groups of VMs and storages.

In a further example, there may be multiple chokepoints identified in the network based on the local patterns. These present a security risk because the graph-based security feature cannot monitor the chokepoints effectively in real-time, thereby providing an easier point of attack in the network. The network modification suggestion provides a modification to the network which removes one or more of the chokepoints, so that the graph-based security feature can monitor a larger proportion of the network in an effective manner.

These network modification suggestions may be provided to an owner or manager of the network. The modifications can then be implemented in the network before the graph-based security features are deployed. This both reduces the security risk overall in the network, and improves the effectiveness of the graph-based security feature.

In another embodiment, the identified candidate node or edge is used to determine a graph modification suggestion. The graph modification suggestion indicates a way in which the graph could be modified to reduce the security risks associated with the graph when used in the graph-based security feature.

Security risks arising from the graph include noise, which reduces the effectiveness of the graph, and overly complex local patterns, such as vortexes and chokepoints, which are slow and difficult to monitor in real-time. To reduce the associated security risks, the graph itself may be modified so that the graph-based security feature can be executed over the graph more efficiently and more quickly, thereby being more effective in use.

For example, the graph modification suggestion may be to cluster nodes, or other similar approaches. This may be implemented if a vortex pattern is identified. The nodes of the vortex are represented in the graph as a single node. Clustering can also be used for chokepoints, with the nodes of the chokepoint being represented as a single node.

In another example, the graph modification may be to remove a node or edge from the graph. The reduces any latencies associated with monitoring the associated asset or relationship.

In some embodiments, graph modification suggestions are provided to an operator of the graph-based security system. The operator can modify the graph based on the suggestion, with the knowledge of the limitations to the security system outputs based on the graph modifications. The operator may modify the graph manually, or the operator may provide an instruction to a graph engine to modify the graph as suggested by the graph modification suggestion.

In other embodiments, the graph modification suggestions are automatically implemented by the graph engine. The operator of the graph-based security system is notified of the modifications so that the operator is aware of any limitations to the outputs of the security system resulting because of the modification.

Additional or alternative security monitoring may be provided at assets associated with modified portions of the graph. This allows the portion which is no longer monitored by the graph-based security feature to still be monitored for security purposes.

An owner of the network represented by the graph may be provided with a notification of any graph modifications used when implementing the graph-based security feature.

The methods 100, 200 of FIGS. 1 and 2 may further comprises steps of implementing the modification suggestion. The modification suggestion may be implemented automatically. Alternatively, the modification suggestion may be implemented in response to user input at a user interface, which the user provides in response to being presented with the modification suggestions.

Figure 3:
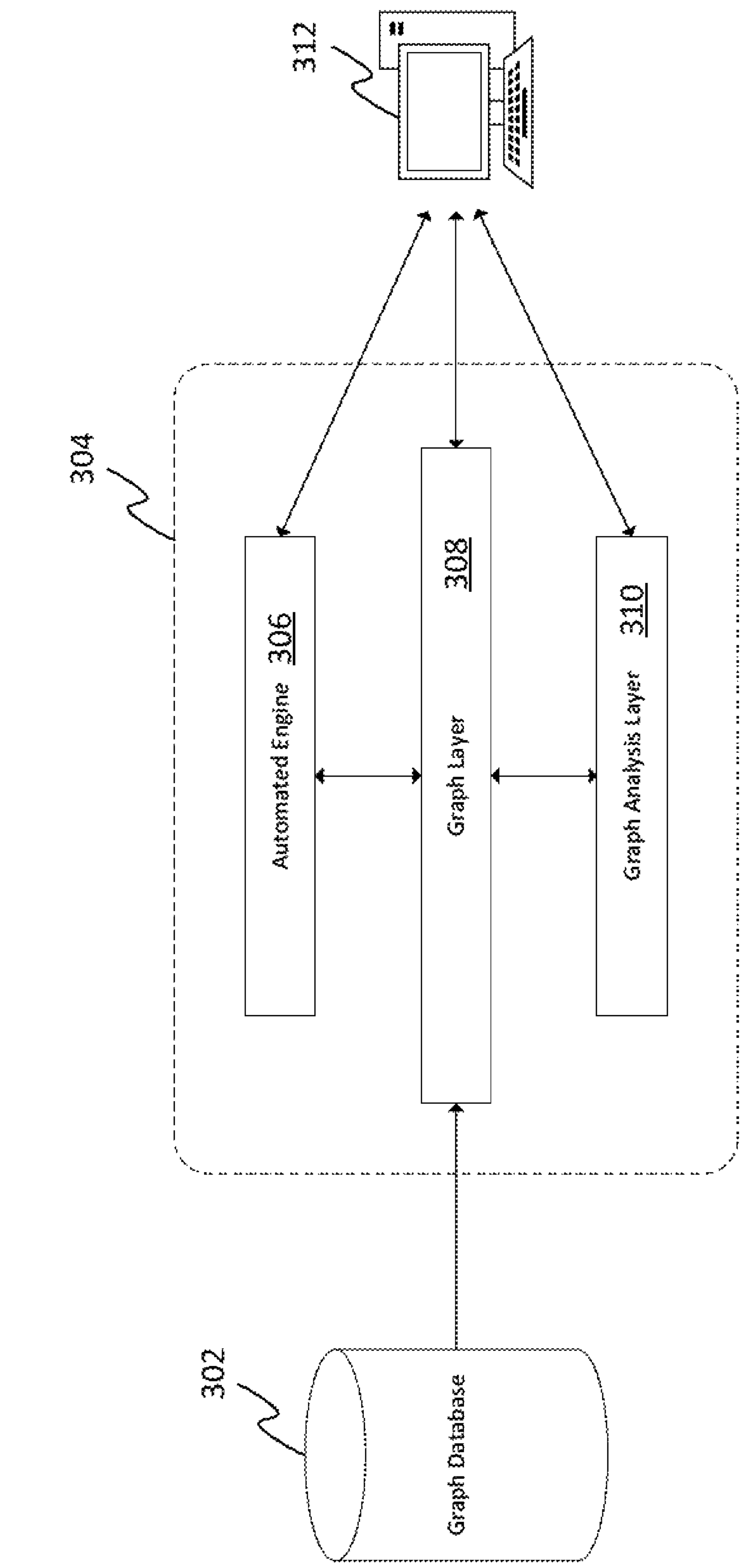
FIG. 3 is a schematic diagram of an example system for executing the methods.

FIG. 3 is a schematic diagram of a system for executing the methods disclosed herein.

A graph-based cyber security system 304 comprises a graph layer 308, an automated engine 306, and a graph analysis layer 310.

The graph layer 308 generates an asset graph representing a network using data stored in a graph database 302. The graph database 302 stores properties or contexts of assets of a network, such as authentication properties, entry points, targets, and vulnerabilities.

The graph layer 308 accesses the graph database 302 and obtains the data stored relating to a network to be monitored. The graph layer 308 uses the obtained data to plot the asset graph.

Figure 4:
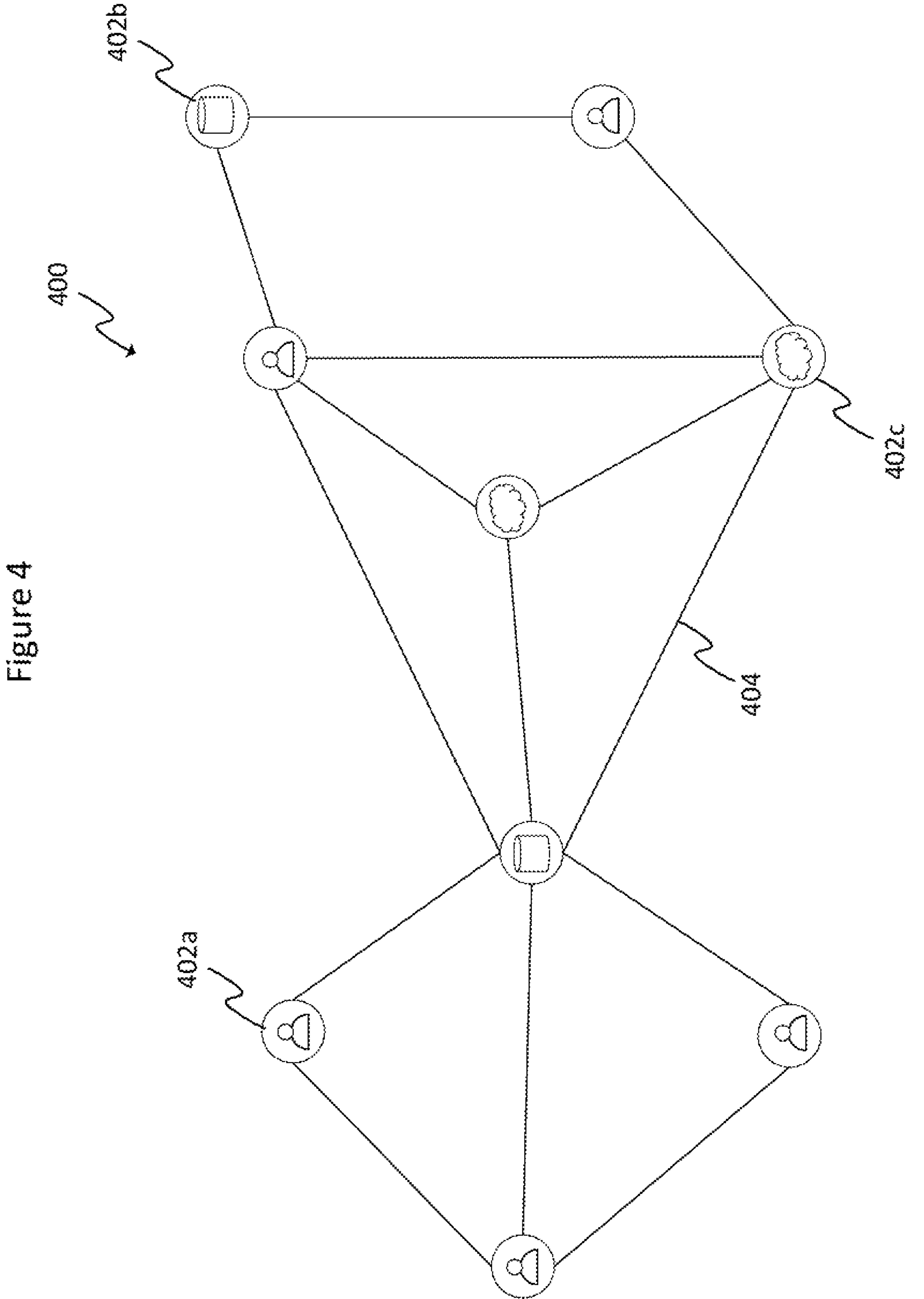
FIG. 4 is an example asset graph.

An example, simplified, network graph 400 is provided in FIG. 4. The network graph 400 comprises a set of nodes 402 connected by edges 404. The nodes 402 represent assets in the network. For example, node 402*a* represents a user, node 402*b* represents a database, and node 402*c* represents a cloud resource.

Each node 402 of the graph is associated with a set of properties, such as applications running on a VM represented by the node 402, whether the asset is connected to the internet, and if the asset stores sensitive data. Other properties associated with the nodes will be apparent. The properties are obtained from the graph database 302. The properties are embedded in the graph 400.

The automated engine 306 is executed during network security monitoring. It takes as input the graph generated by the graph layer 308, and attempts to predict paths between entry points and targets in the network. These paths may have multiple steps.

Once the paths have been identified, the automated engine 306 analyses the paths to identify any paths which have properties matching one or more predefined attack path conditions. The predefined attack path conditions define a set of properties of paths which are likely to be vulnerable to a cyber security attack, or simulate the properties of an attack. If a path has properties matching the predefined attack path conditions, the path is highlighted.

The automated engine 306 may generate an action.

In one embodiment, the action is a reporting action.

For example, in implementation, the automated engine 306 provides an output comprising a summary or other report (e.g. with suggested remediation action(s)). In this case, the reporting action may comprise outputting the report to an operator, e.g. via a graphical user interface (GUI). If a security threat is identified, a suitable alert may be generated, e.g. at a GUI available to an operator or network manager, which indicates the potential threat.

In another embodiment, the action is a remediation action. For example, if the output recommends a remediation action (e.g., revoking or restricting an access privilege associated with a user account, device, or other entity, e.g. locking a user account, or revoking administrator privileges; quarantining a file or software entity such as an application, process or service; or isolating a device from a network or system etc.), the recommended remediation action may be triggered automatically. These entities which are identified by the automated engine 306 as relating to an attack and which are identified in the action may be referred to as security action assets of the network.

As set out above, some configuration of a network may cause the automated engine 306 to be less effective and efficient when using the graph 400 generated by the graph layer 308.

To overcome the inefficiencies and reduced effectiveness caused by the graph 400, the graph analysis layer 310 is used to analyse the graph 400 prior to it being used by the automated engine 306. The graph analysis performed by the graph analysis layer 310 can be considered an intermediary step between obtaining the graph data and generating paths between entry points and targets.

The graph analysis layer 310 obtains the graph 400 from the graph layer 308. The graph analysis layer 310 then executes the method 100, 200 described herein to analyse the graph 400.

In summary, the graph analysis layer 310 calculates local connectivity metrics for the nodes 402 of the graph 400. Based on the local connectivity metrics, the graph analysis layer 310 identifies local patterns which are associated with potential security risks. The nodes and/or edges of the local patterns are identified.

The graph analysis layer 310 may be referred to as comprising a toolkit. The toolkit includes instructions for computing each of the local connectivity metrics and identifying local patterns based on the local connectivity metrics.

The graph analysis layer 310 may also generate a predictive model to predict noisy paths in the graph. Nodes and/or edges associated with noisy paths can therefore be identified.

The graph analysis layer 310 may generate graph and/or network modification suggestions based on the output of the analysis. These are discussed in more detail above. The graph analysis layer 310 may comprise a library or database storing modification suggestions and graph conditions which, if met, cause the graph analysis layer to provide the modification suggestion. For example, the graph analysis layer 310 may store the graph modification suggestion of "cluster nodes" with the graph condition "vortex local pattern". In this way, when a vortex local pattern is identified, the graph analysis layer 310 provides the graph modification suggestion of clustering the nodes of the vortex. It will be appreciated that this is a simplified example and the conditions stored in association with a modification suggestion may have other defined parameters.

When calculating connectivity metrics and local patterns for the graph 400, the graph analysis layer 310 may iterate through the nodes 402 of the graph 400. That is, the graph analysis layer 310 performs calculations for each node 402 individually, node-by-node, rather than attempting to process the nodes 402 of the graph 400 simultaneously. This reduces the computational load of the graph analysis layer 310, and allows complex patterns to be analysed with higher accuracy therefore generating improved results.

The graph analysis layer 310 may generate a user interface for providing to a user device 312. The user device 312 may be user device of an operator of the graph-based cyber security system 304. The user device 312 may be the user device of an owner or manager of the network represented by the graph 400.

The user interface generated by the graph analysis layer 310 and provided to the user device 312 may indicate the candidate nodes or candidate edges which have been identified as relating to the local patterns associated with a security risk. The user interface may also include the graph 400, or a portion of the graph 400 associated with the candidate node or candidate edge. A portion of the graph associated candidate nodes or candidate edges may be automatically highlighted or otherwise rendered distinguishable from the other parts of the graph 400. For example, an icon representing the identified candidate node or candidate edge may be rendered at, or moved to, to a portion of the user interface which is provided for identifying candidate nodes/edges to a user. In some embodiments, the assets and/or relationship associated with the candidate nodes and/or edges are rendered at the user interface. For example, the asset or relationship may be rendered next to the node/edge representing it, or in an area of the user interface for identifying possibly problematic assets or relationships.

The user interface generated by the graph analysis layer 310 and provided to the user device 312 may provide the modification suggestion. The modification suggestions may be provided at the user interface as plaintext. Alternatively or additionally, the modification suggestions may be provided graphically, by for example generating a modified network graph representing the network with the modification suggestion implemented.

The graph analysis layer 310 may provide graph modification instructions to the graph layer 308. The graph modification instruction may be provided automatically, or in response to an instruction received from the user device 312 to implement the provided graph modification suggestion. The graph modification instruction provides an instruction to modify the graph 400 in accordance with the graph modification suggestion identified by the graph analysis layer 310. Therefore, the graph modification instruction causes the graph modification to be implemented.

The graph layer 308 modifies the graph 400 in response to the graph modification instruction received from the graph analysis layer 310. Once modified, the modified graph is provided to the automated engine 306 for monitoring, as described above.

It will be appreciated that, in some instances, a network or its representative graph may require no modifications before it can be used by the automated engine 306. In this case, the graph analysis layer sends a message to the graph layer 308 to indicate that the graph is ready for use by the automated engine.

If the network itself is modified in response to a network modification suggestion, the data stored in the graph database 302 is updated. The graph layer 308 accesses the graph database 302 again and generates a new graph 400 which represents the now modified network.

The new graph 400 may be processed by the graph analysis layer 310 to determine if there are any further modifications which could be made to improve the effectiveness of the graph-based security feature. Further modifications may arise due to the new construction of the network.

If further modifications are identified, modification suggestions are provided as described above. If no further modifications are identified, the graph analysis layer 310 sends a notification to the graph layer 308 to indicate that the graph 400 can be provided to the automated engine 306 for monitoring.

Each of the graph layer 308 and automated engine 306 may also generate user interfaces for providing information to the user device 312.

The graph layer 308 may, for example, generate a graph user interface for rending the graph 400 on a display of the user device 312. The graph user interface may be interactable, so that a user can select nodes 402 of the graph 400 to display properties of the associated asset for example. Other interactable properties of the graph user interface will be apparent.

The automated engine 306 may generate a security monitoring user interface, which provides details of identified attack paths. These may be rendered relative to the graph 400.

In some embodiments, the graph-based cyber security system comprises a user interface layer. The user interface layer receives information from each of the automated engine 306, graph layer 308, and graph analysis layer 310, for generating a user interface for providing to the user device 312. In this way, the user interface layer can generate user interfaces which comprise information from one or more of the automated engine 306, graph layer 308, and graph analysis layer 310 without these layers 306, 308, 310 needing to send all of the necessary data to each other. The user interface layer can also receive messages from the user device 312, such as instructions to implement the suggested graph modification. The user interface layer passes the message directly to the graph layer 308, without the need to pass through the graph analysis layer 310.

The graph-based cyber security system 304 may be executed on a physical server or on a cloud computing server. The elements of the graph-based cyber security system 304 may be distributed across multiple servers. Similarly, the graph database 302 may be stored on a on a physical server or on a cloud computing server.

The graph database 302, graph-based cyber security system 304, and user device 312 may communicate with each other over a network, such as the Internet. The components 306, 308, 310 of the graph-based cyber security system 304 may communicate via a local network or via the Internet.

The components 306, 308, 310 of the graph-based cyber security system 304 are stored as code instructions in a memory, executable on one or more processors to execute the functions disclosed herein.

The graph database 302 is shown to be outside of the graph-based cyber security system 304. However, it will be appreciated that the graph database 302 may be a component of the graph-based cyber security system 304.

In the disclosure herein, reference is made to graph-based, or map-based, security features. These features are executed by the automated engine 306 shown in FIG. 3, and relate to cyber security monitoring and analysis of a network using a graph representation of the network, including XSPM and XDR.

Figure 5:
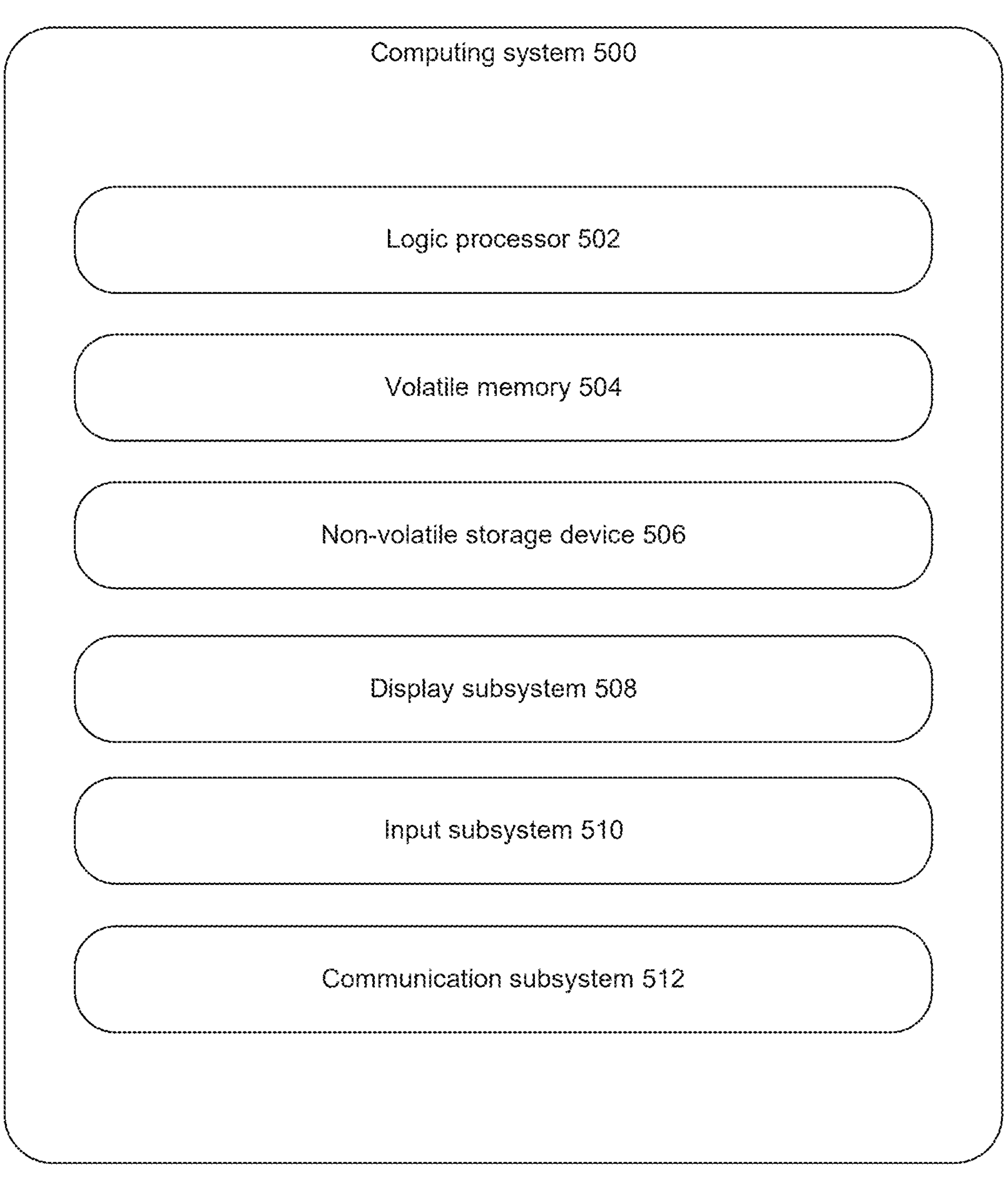
FIG. 5 is a schematic block diagram of an example computing system.

FIG. 5 schematically shows a non-limiting example of a computing system 500, such as a computing device or system of connected computing devices, that can enact one or more of the methods or processes described above. Computing system 500 is shown in simplified form. Computing system 500 includes a logic processor 502, volatile memory 504, and a non-volatile storage device 506. Computing system 500 may optionally include a display subsystem 508, input subsystem 510, communication subsystem 512, and/or other components not shown in FIG. 5. Logic processor 502 comprises one or more physical (hardware) processors configured to carry out processing operations. For example, the logic processor 502 may be configured to execute instructions that are part of one or more applications, programs, routines, libraries, objects, components, data structures, or other logical constructs. The logic processor 502 may include one or more hardware processors configured to execute software instructions based on an instruction set architecture, such as a central processing unit (CPU), graphical processing unit (GPU) or other form of accelerator processor. Additionally or alternatively, the logic processor 502 may include a hardware processor(s)) in the form of a logic circuit or firmware device configured to execute hardware-implemented logic (programmable or non-programmable) or firmware instructions. Processor(s) of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor 502 may be virtualized and executed by remotely accessible, networked computing devices configured in a cloud-computing configuration. In such a case, these virtualized aspects are run on different physical logic processors of various different machines. Non-volatile storage device 506 includes one or more physical devices configured to hold instructions executable by the logic processor 502 to implement the methods and processes described herein. When such methods and processes are implemented, the state of non-volatile storage device 506 may be transformed—e.g., to hold different data. Non-volatile storage device 506 may include physical devices that are removable and/or built-in. Non-volatile storage device 506 may include optical memory (e g., CD, DVD, HD-DVD, Blu-Ray Disc, etc.), semiconductor memory (e g., ROM, EPROM, EEPROM, FLASH memory, etc.), and/or magnetic memory (e.g., hard-disk drive), or other mass storage device technology. Non-volatile storage device 506 may include nonvolatile, dynamic, static, read/write, read-only, sequential-access, location-addressable, file-addressable, and/or content-addressable devices. Volatile memory 504 may include one or more physical devices that include random access memory. Volatile memory 504 is typically utilized by logic processor 502 to temporarily store information during processing of software instructions. Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example. The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. Different modules, programs, and/or engines may be instantiated from the same application, service, code block, object, library, routine, API, function, etc. Likewise, the same module, program, and/or engine may be instantiated by different applications, services, code blocks, objects, routines, APIs, functions, ctc. The terms "module," "program," and "engine" may encompass individual or groups of executable files, data files, libraries, drivers, scripts, database records, etc. When included, display subsystem 508 may be used to present a visual representation of data held by non-volatile storage device 506. The visual representation may take the form of a graphical user interface (GUI). As the herein-described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices. When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, colour, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor. When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the internet. The term computer readable media as used herein may include computer storage media. Computer storage media may include volatile and non-volatile, removable and nonremovable media (e.g., volatile memory 504 or non-volatile storage 506) implemented in any method or technology for storage of information, such as computer readable instructions, data structures, or program modules. Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by a computing device (e.g. the computing system 500 or a component device thereof). Computer storage media does not include a carrier wave or other propagated or modulated data signal. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct wired connection, and wireless media such as acoustic, radio frequency (RF), infrared, and other wireless media.

It will be appreciated that the above embodiments have been disclosed by way of example only. Other variants or use cases may become apparent to a person skilled in the art once given the disclosure herein. The scope of the present disclosure is not limited by the above-described embodiments, but only by the accompanying claims.

The invention claimed is:

1. A computer-implemented method comprising:

obtaining an asset graph representing a network, the asset graph comprising a plurality of nodes representing assets of the network and edges representing relationships between the assets;

calculating, using the asset graph, a local connectivity metric for a node of the asset graph, wherein the local connectivity metric is a product of an InDegree of the node and an OutDegree of the node, a betweenness of the node, or an in/out node similarity of the node;

based on the local connectivity metric, identifying a local pattern associated with a potential security risk; and identifying a candidate node or a candidate edge based on the identified local pattern associated with the potential security risk.

2. The method of claim 1, wherein the method further comprises determining a modification suggestion based on the candidate node or candidate edge which, when implemented, reduces the potential security risk.

3. The method of claim 2, wherein the method further comprises:

obtaining an updated asset graph representing the network after the modification suggestion has been implemented;

providing the updated asset graph to an automated engine as an input;

receiving an output from the automated engine in response to the input; and causing a security action to be performed based on the output.

4. The method of claim 3, wherein the output identifies a security action asset of the network, wherein the security action comprises:

generating at a user interface an alert pertaining to the security action asset;

revoking or restricting an access privilege associated with the security action asset;

quarantining the security action asset; or isolating the security action asset from a network or system.

5. The method of claim 1, wherein the product of the InDegree of the node and the OutDegree of the node is a connectivity c of a node v:

$$c(v) = InDegree(v) \cdot OutDegree(v).$$

6. The method of claim 1, wherein the betweenness of the node is a betweenness b of a node v:

$$b(v) = \sum \frac{\sigma_{st}(v)}{\sigma_{st}}$$

where $\sigma_{st}$ is a number of shortest paths between s and t, and $\sigma_{st}(v)$ is a number of such paths passing though v.

7. The method of claim 1, wherein the in/out node similarity of the node is an in/out node similarity s of a node v with inbound set I and outbound set O:

$$s(v) = \frac{I_v \cap O_v}{I_v \cup O_v}.$$

8. The method of claim 1, wherein the identified local pattern is a chokepoint.

9. The method of claim 1, wherein the identified local pattern is a vortex, in which several nodes are connected in a path via several tokens.

10. The method of claim 1, wherein the method further comprises:

predicting a number of access paths passing through the identified local pattern;

determining that the predicted number of access paths passing through the identified local pattern exceeds an access path threshold; and identifying the candidate node or candidate edge based on the determination that the predicted number of access paths passing through the identified local pattern exceeds the access path threshold.

11. The method of claim 2, wherein the modification suggestion is a network modification suggestion, wherein the method further comprises:

identifying a candidate asset or candidate relationship associated with the candidate node or candidate edge respectively; and determining the network modification suggestion based on the candidate asset or candidate relationship which, when implemented in the network, reduces the potential security risk.

12. The method of claim 11, wherein the network modification suggestion comprises removing a token associated with the candidate relationship from the network.

13. The method of claim 11, wherein the network modification suggestion comprises reducing allowed access to the candidate asset in the network.

14. The method of claim 2, wherein the modification suggestion is a graph modification suggestion, wherein the method further comprises determining the graph modification suggestion for modifying the asset graph representing the network based on the candidate node or candidate edge, which when implemented reduces the potential security risk when the asset graph is executed by a security management system.

15. The method of claim 14, wherein multiple candidate nodes are identified, wherein the graph modification suggestion comprises clustering the multiple candidate nodes associated to generate an asset cluster node.

16. The method of claim 14, wherein the graph modification suggestion comprises removing the candidate node or candidate edge from the asset graph.

17. The method of claim 14, wherein the method further comprises modifying the asset graph based on the graph modification suggestion to generate a modified asset graph.

18. The method of claim 1, wherein the method further comprises generating a user interface based on the candidate node or candidate edge, and providing the user interface to a user device for rendering thereat.

19. A computer system, comprising:

a processing unit; and a computer-readable medium having encoded thereon computer-executable instructions to cause the processing unit to:

obtain an asset graph representing a network, comprising a plurality of nodes representing assets of the network and edges representing relationships between the assets;

calculate, using the asset graph, a local connectivity metric for a node of the asset graph, wherein the local connectivity metric is a product of an InDegree of the node and an OutDegree of the node, a betweenness of the node, or an in/out node similarity of the node;

based on the local connectivity metric, identify a local pattern associated with a potential security risk;

identify a candidate node or a candidate edge associated with the potential security risk; and determine a modification suggestion based on the candidate node or candidate edge which, when implemented, reduces the potential security risk.

20. A computer program product comprising a computer-readable storage medium having instructions recorded thereon for enabling a processor-based system to perform operations, the operations comprising:

obtaining an asset graph representing a network, comprising a plurality of nodes representing assets of the network and edges representing relationships between the assets;

calculating, using the asset graph, a local connectivity metric for a node of the asset graph, wherein the local connectivity metric is a product of an InDegree of the node and an OutDegree of the node, a betweenness of the node, or an in/out node similarity of the node;

based on the local connectivity metric, identifying a local pattern associated with a potential security risk;

identifying a candidate node or a candidate edge associated with the potential security risk; and determining a modification suggestion based on the candidate node or candidate edge which, when implemented, reduces the potential security risk.

* * * * *